United States Patent
Pan et al.

(10) Patent No.: US 12,548,316 B2
(45) Date of Patent: Feb. 10, 2026

(54) MULTI-DIMENSION UNIFIED SWIN TRANSFORMER FOR LESION SEGMENTATION

(71) Applicant: Merck Sharp & Dohme LLC, Rahway, NJ (US)

(72) Inventors: Shaoyan Pan, Decatur, GA (US); Yiqiao Liu, Pittsburgh, PA (US); Antong Chen, Blue Bell, PA (US); Gregory Goldmacher, Lincoln, MA (US)

(73) Assignee: Merck Sharp & Dohme LLC, Rahway, NJ (US)

(*) Notice: Subject to any disclaimer, the term of this patent is extended or adjusted under 35 U.S.C. 154(b) by 300 days.

(21) Appl. No.: 18/504,075

(22) Filed: Nov. 7, 2023

(65) Prior Publication Data

US 2024/0161490 A1    May 16, 2024

Related U.S. Application Data

(60) Provisional application No. 63/423,793, filed on Nov. 8, 2022.

(51) Int. Cl.
*G06V 10/00* (2022.01)
*G06V 10/77* (2022.01)
(Continued)

(52) U.S. Cl.
CPC .......... *G06V 10/82* (2022.01); *G06V 10/7715* (2022.01); *G06V 10/7753* (2022.01); *G06V 2201/03* (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 10,332,261 B1 * 6/2019 Farivar .................... G06N 3/08
10,867,384 B2 * 12/2020 Song .................... G06N 3/0895
(Continued)

FOREIGN PATENT DOCUMENTS

CN    115049879 A    9/2022
CN    115187539 A    10/2022

OTHER PUBLICATIONS

PCT International Search Report and Written Opinion, PCT Application No. PCT/US2023/036963, Feb. 15, 2024, 10 pages.

*Primary Examiner* — Amir Alavi
(74) *Attorney, Agent, or Firm* — Fenwick & West LLP

(57) ABSTRACT

A system and method of multi-stage training of a transformer-based machine-learning model. The system performs at least two stages of the following three stages of training: During a first stage, the system pre-trains a transformer encoder via a first machine-learning network using an unlabeled 3D image dataset. During a second stage, the system fine-tunes the pre-trained transformer encoder via a second machine-learning network via a labeled 2D image dataset. During a third stage, the system further fine-tunes the previously pre-trained transformer encoder or fine-tuned transformer encoder via a third machine-learning network using a labeled 3D image dataset.

20 Claims, 9 Drawing Sheets

(51) Int. Cl.
*G06V 10/774* (2022.01)
*G06V 10/82* (2022.01)

(58) Field of Classification Search
CPC ...... G06N 3/088; G06N 3/092; G06N 3/0454; G06N 3/0475; G06N 3/0464; G06N 20/00; G06N 20/10; G06N 20/20; G06V 10/82; G06V 10/761; G06V 10/762; G06V 10/764; G06V 10/765; G06V 10/7715; G06V 10/774; G06V 10/7753; G06V 20/64; G06V 2201/03
See application file for complete search history.

(56) References Cited

U.S. PATENT DOCUMENTS

| | | | | |
|---|---|---|---|---|
| 11,151,721 B2* | 10/2021 | Avendi | ................ | G06V 10/803 |
| 11,403,761 B2* | 8/2022 | Krebs | ...................... | G06T 7/33 |
| 11,488,309 B2* | 11/2022 | Heng | ...................... | G06N 3/045 |
| 11,631,500 B2* | 4/2023 | Krebs | ................... | G06F 18/214 |
| | | | | 600/479 |
| 12,002,202 B2* | 6/2024 | Kiyasseh | ................. | G06N 3/08 |
| 12,211,202 B2* | 1/2025 | Anand | ................ | G06N 3/0455 |
| 12,277,753 B1* | 4/2025 | Bharaj | ................ | G06V 10/751 |
| 12,373,956 B2* | 7/2025 | Shaker | ................... | G16H 30/40 |
| 2021/0374518 A1 | 12/2021 | Zhu et al. | | |
| 2022/0189028 A1 | 6/2022 | Yoo et al. | | |
| 2022/0328189 A1 | 10/2022 | Zhou et al. | | |
| 2023/0161998 A1* | 5/2023 | Wang | ...................... | G06N 3/04 |
| | | | | 703/11 |
| 2024/0161490 A1* | 5/2024 | Pan | ................... | G06V 10/7753 |

\* cited by examiner

MULTI-DIMENSION UNIFIED SWIN TRANSFORMER FOR LESION SEGMENTATION

CROSS REFERENCE TO RELATED APPLICATION

This application claims the benefit of U.S. Provisional Patent Application No. 63/423,793, filed Nov. 8, 2022, which is incorporated by reference.

TECHNICAL FIELD

The disclosure relates generally to the field of image processing, and in particular to the automatic segmentation of medical images, such as Computed Tomography (CT) images.

BACKGROUND

In various medical fields, computed tomography (CT) and magnetic resonance (MR) images are used in clinical care and clinical trials to assess the effects of treatment on lesion size over time. Lesion size is often characterized using a single-diameter measurement. Current methods of obtaining a single-diameter measurement often involve medical professionals manually delineating the boundary of a lesion on a single slice where the lesion looks the largest. The size of the lesion may then be estimated based on the single-diameter measurement. Alternatively, each slice of a three-dimensional (3D) image needs to be annotated by medical professionals. Features describing the properties of the lesion may be extracted, and the size of the lesion may then be more accurately measured based on the annotated 3D image. However, 3D annotation is a time-consuming, resource-intensive, and labor-intensive task.

Further, existing automated 3D segmentation methods are often highly sensitive to initial training data. As such, they are unable to adapt to lesions of varying sizes, shapes, and locations. For example, existing automated image segmentation machine learning technologies present various disadvantages, such as (but not limited to) overfitting, providing inaccurate contours, high network complexity, etc.

SUMMARY

Embodiments described herein relate to a system and method of multi-stage training of a transformer-based machine-learning model. The multi-stage training includes at least two of the following three stages. During a first stage of training, a transformer encoder is pre-trained via a first machine-learning network using an unlabeled 3D image dataset. The unlabeled 3D image dataset includes a plurality of 3D volumes, each of which includes multiple slices above and below the 2D annotation made by the reader. There are various oncology response criteria based on which readers or experts make annotations on images. In some embodiments, the 2D annotation is based on Response Evaluation Criteria in Solid Tumors (RECIST), and the 3D volume includes one slice that is annotated according to RECIST and multiple slices above and below without annotations.

The first machine-learning network includes the transformer encoder, a first convolutional neural network (CNN) and/or transformer decoder, and a contrastive encoder. The transformer encoder is connected to the first CNN/transformer decoder and the contrastive encoder in parallel. The transformer encoder receives a 3D image in the unlabeled three-dimensional (3D) image dataset as input to generate an output. The first CNN/transformer decoder and the contrastive encoder each receive the output of the transformer encoder to generate a reconstructed volume and a feature map, respectively.

During a second stage of training, the pre-trained transformer encoder is fine-tuned via a second machine-learning network using a labeled two-dimensional (2D) image dataset. The labeled 2D image dataset includes a plurality of 2D images, each of which has an annotation. The second machine-learning network includes the pre-trained transformer encoder and a second CNN/transformer decoder. The pre-trained transformer encoder receives a 2D image in the labeled two-dimensional (2D) image dataset as input to generate an output, and the second CNN/transformer decoder receives the output of the pre-trained transformer encoder to generate a 2D segmentation map.

During a third stage of training, the pre-trained or previously fine-tuned transformer encoder is further fine-tuned via a third machine-learning network using a labeled 3D image dataset. The labeled 3D image dataset includes a plurality of 3D images of lesions, where boundaries of lesions are annotated. The third machine-learning network includes the pre-trained or fine-tuned transformer encoder and a third CNN/transformer decoder. The pre-trained or previously fine-tuned transformer encoder receives an image in the labeled 3D image dataset as input to generate an output, and the third CNN/transformer decoder receives the output of the transformer encoder to generate a 3D segmentation map.

In some embodiments, the multi-stage training includes all three stages of training. In some embodiments, the multi-stage training includes two of the three stages of training.

In some embodiments, two or three stages of training may be performed simultaneously by using multiple decoders at the same time. Alternatively, two or three stages of training may be performed alternatively by swapping the decoders for different inputs.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
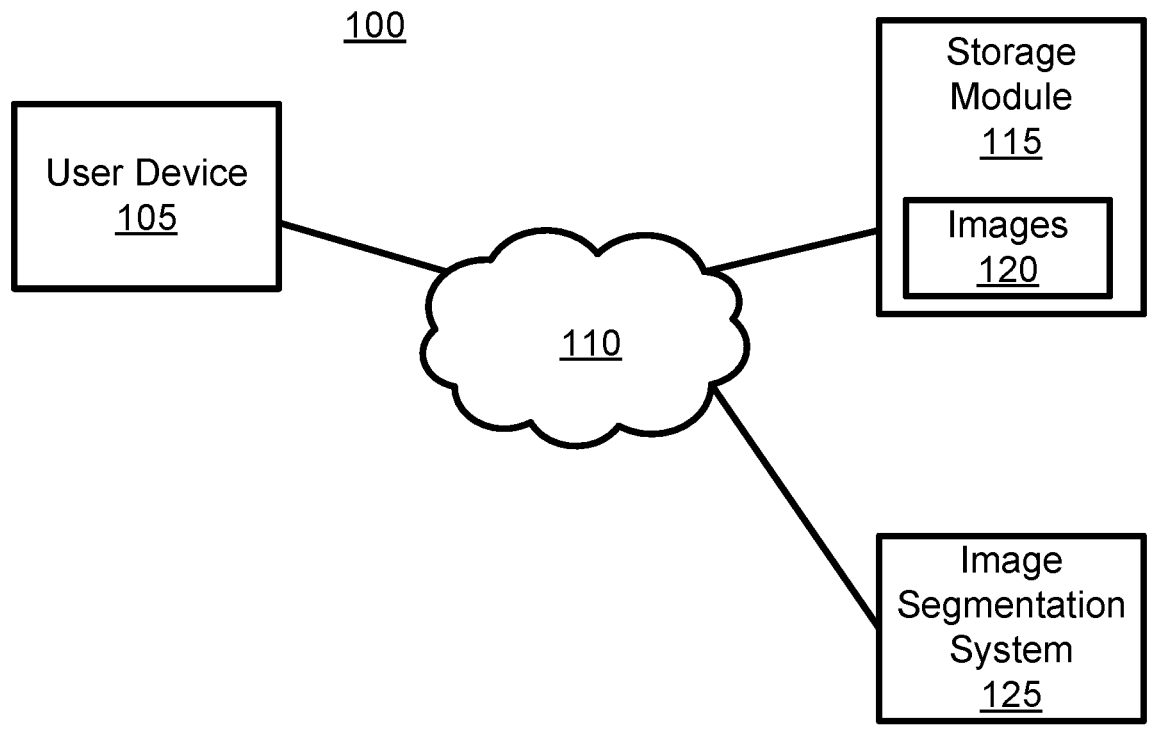
FIG. 1 illustrates a diagram of a system environment of an image segmentation system, according to one embodiment.

Within numerous medical disciplines, e.g., oncology research, it is desirable to segment lesions accurately from CT scans in 3D. This segmentation aids in deriving 3D radiomics features from lesions and modeling their growth kinetics. However, based on the Response Evaluation Criteria in Solid Lesions (RECIST) guidelines, radiologists typically outline each lesion on the axial slice that displays the largest transverse section. Occasionally, they will delineate a few lesions in 3D for research. Consequently, when aiming to train models for automatic lesion segmentation, available images often include numerous unlabeled 3D scans, a decent volume of labeled 2D images, and a limited number of labeled 3D scans. This disparity makes 3D model training very difficult.

It should be recognized that RECIST serves only as an illustrative example of oncology response criteria; numerous other criteria may be employed by specialists to annotate medical imagery. The aforementioned issues are not exclusive to RECIST-annotated images but also extend to those annotated according to alternative oncological response criteria.

The embodiments described herein include a novel machine learning model that solves the above described problem. In particular, the machine learning model described herein is trained using both 2D and 3D images (including labeled and unlabeled images) for 3D lesion segmentation automation. The trained model using the embodiments described herein was tested against existing leading CNN-based and transformer-based segmentation models, and demonstrated improved performance over the existing models.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Overview of Method

Radiologists applying the Response Evaluation Criteria in Solid Tumors (RECIST) in clinical trials, or other efficacy assessment approaches used in clinical care, routinely annotate the central slice of a tumor to keep track of lesion size change. Accurately defining the boundaries of the lesion in 3D aids in the extraction of radiomic features from the lesion and more comprehensive lesion size measurement, which cannot be achieved with RECIST-based annotations. Existing automated image segmentation machine-learning technologies present various disadvantages, such as (but not limited to) overfitting to particular lesion types, e.g. lung lesions, providing inconsistent contours between 2D slices, high network complexity, etc.

The principles described herein disclose a novel automatic segmentation system or method for more accurately and efficiently segmenting lesions in three-dimensional (3D) medical imaging, such as (but not limited to) CT scans. Further, unlike existing technologies, which often use either two-dimensional (2D) or 3D images to train machine learning models, embodiments described herein use both 2D and 3D images to train a single model.

In some embodiments, machine learning models described herein are Swin transformer-based machine-learning models. Further, the training of a Swin transformer-based machine-learning model described herein includes multiple stages. During a first stage, a transformer encoder is pre-trained via a first machine-learning network over an unlabeled 3D image dataset. The unlabeled 3D image dataset includes a plurality of 3D images, each of which includes multiple slices above and below the original 2D RECIST annotation. During this stage, the transformer encoder uses the vast number of unlabeled 3D lesion scans to perform self-supervised tasks to obtain the lesion anatomy's inherent structure.

During a second stage, the pre-trained transformer encoder is fine-tuned via a second machine-learning network over a labeled 2D RECIST dataset. The labeled 2D image dataset includes a plurality of 2D images, each of which has a corresponding RECIST annotation. During this stage, the transformer encoder is refined using 2D RECIST slices, enhancing its comprehension at a 2D slice level.

During a third stage, the pre-trained transformer encoder or the 2D fine-tuned transformer encoder is further fine-tuned via a third machine-learning network over a labeled 3D image dataset. The labeled 3D image dataset includes a plurality of 3D images of lesions, where boundaries of lesions are annotated. During this stage, the transformer encoder is further refined using labeled 3D scans, enhancing its comprehension at a 3D volume level.

In some embodiments, all three stages of training are performed. Alternatively, only two of the three stages of training, or only one of the two supervised stages with annotations are performed.

In some embodiments, two or three stages of training may be performed simultaneously by using multiple decoders at the same time. Alternatively, two or three stages of training may be performed alternatively by swapping the decoders for different inputs.

Example Systems

FIG. 1 illustrates one embodiment of a system environment 100 suitable for training the machine-learning model and/or providing the trained machine-learning model for image segmentation. In the embodiment shown, the environment 100 includes a user device 105, a network 110, a storage module 115, and an image segmentation system 125. In other embodiments, the system environment 100 includes different and/or additional elements. In addition, the functions may be distributed among the elements in a different manner than described.

The user device 105 is one or more computing devices capable of receiving user input as well as transmitting and/or receiving data via a network 110. In one embodiment, a user device 105 is a computer system, such as a desktop or a laptop computer. Alternatively, a user device 105 may be a device having computer functionality, such as a personal digital assistant (PDA), a mobile telephone, a smartphone, or another suitable device. A user device 105 is configured to communicate via the network 110. The user device 105 may execute an application allowing a user of the user device 105 to interact with the image segmentation system 125 via a user interface. For example, a web browser application may enable interaction between the user device 105 and the image segmentation system 125 via the network 110, or a graphical user interface may be provided as part of a software application published by the image segmentation system 125 and installed on the user device 105. Alternatively, a user device 105 interacts with the image segmentation system 125 through an application programming interface (API) running on a native operating system of the user device 105, such as IOS® or ANDROID™.

The storage module 115 is one or more machine-readable media that store images 120. The storage module 115 may receive and store images 120 from a user device 105, the image segmentation system 125, third-party databases, and the like. In some embodiments, images are computed tomography (CT) images taken of one or more subjects. The images may include lesions in organs, such as lung and liver tumors, malignant enlarged lymph nodes, or lesions in anatomic spaces, such as mediastinal or retroperitoneal lesions. Images taken consecutively may have spatial dependence. For example, consecutive images may correspond to a set of CT images of a single subject (e.g., CT slices captured along the axial direction of a lesion). Images may correspond to "center slices" and/or "edge slices." Center slices are CT images that have been taken where the lesion looks largest along the axial direction of the lesion. Edge slices are additional CT images of lesions taken at additional locations along the axial direction of the lesions. The storage module 115 may store images used for training, validation, and testing of the image segmentation system 125. A portion of these images may include manual delineations, such as center slices that have been manually delineated to include a single diameter measurement. A portion of these images may include manual delineations at center slices and edge slices that have been manually delineated. An additional portion of these images may not include manual delineations, such as edge slices, that are segmented and refined during inference. In one embodiment, a module with similar or identical functionality to the storage module 115 is integrated into the image segmentation system 125.

The image segmentation system 125 segments CT images to generate 3D segmentations from 2D images (which are also referred to as "slices") and 3D images (which are also referred to as "volumes"). In some embodiments, the image segmentation system 125 uses a Swin transformer-based network. Various embodiments of the image segmentation system 125 are described in greater detail below, with reference to FIGS. 2 through 6.

The user device 105, storage module 115, and image segmentation system 125 are configured to communicate via a network 110, which may include any combination of local area and/or wide area networks, using both wired and/or wireless communication systems. In one embodiment, a network 110 uses standard communications technologies and/or protocols. For example, a network 110 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 110 may be represented using any suitable format, such as hypertext markup language (HTML) or extensible markup language (XML). In some embodiments, all or some of the communication links of a network 110 may be encrypted using any suitable technique.

Figure 2:
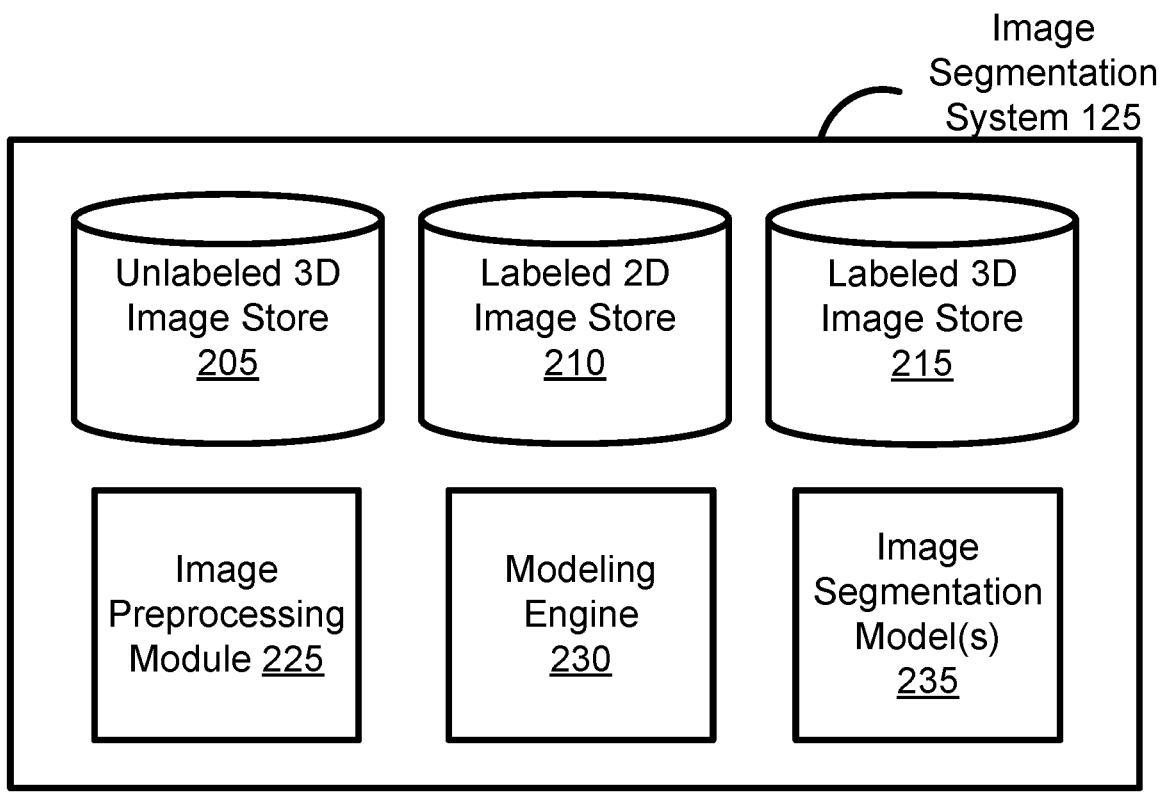
FIG. 2 is a block diagram of an overall architecture of a modeling engine for training a multi-dimension unified Swin transformer (MDU-ST), according to one embodiment.

FIG. 2 shows one embodiment of the image segmentation system 125 of FIG. 1. In the embodiment shown, the image segmentation system 125 includes an unlabeled 3D image store 205, a labeled 2D image store 210, a labeled 3D image store 215, an image preprocessing module 225, a modeling engine 230, and trained image segmentation model(s) 235. In other embodiments, the image segmentation system 125 includes different and/or additional elements. In addition, the functions may be distributed among the elements in a different manner than described.

The unlabeled 3D image store 205 contains 3D images, each of which includes multiple slices above and below tumors identified by RECIST annotation in 2D. The labeled 2D image store 210 contains labeled 2D images, each of which is with a RECIST annotation. The labeled 3D image store 215 contains labeled 3D images. The boundaries of lesions (such as tumors) in each of the labeled 3D images are annotated. The labeled 2D or 3D images may be obtained from CT slices of lesions that have been captured along an axis of the lesion. The number of slices captured for a single lesion and slice thickness may vary. For example, a set of 2D images or a 3D image may include or be derived from CT slices with a thickness of 1 mm or less, 5 mm or less, 10 mm or less, 15 mm or less, and the like.

Example Embodiments of Preprocessing of Images

In some embodiments, the image preprocessing module 225 is configured to preprocess images before training or segmentation. Preprocessing may include cropping a region of interest on the image to a bounding box. The edges of the bounding box may correspond to a dimension of the subject. For example, each edge of the bounding box may be a multiple of the lesion's longest diameter (e.g., one, two, three, five times the longest diameter). Preprocessing may also include modifying the intensity of each image. For example, the intensity may be converted into Hounsfield units using various linear transformation parameters (e.g., linear transform parameters recorded in the DICOM header). The dynamic range of the intensity may then be shifted and/or cut-off at zero such that all intensity values are non-negative. Further, the intensity may be normalized such that the intensity values range from zero to unity. In this way, the relative intensity changes between voxels are preserved.

In some embodiments, during different stages of training, the image preprocessing module 225 performs different preprocessing to the image datasets stored in image stores 205, 210, and/or 215. For example, in some embodiments, during the first stage, 3D image dataset with RECIST annotations (which may be stored in image store 205) is preprocessed. Each RECIST annotation is a labeled central slice of a 3D lesion volume where the lesion appears to have a longest diameter d. The image preprocessing module 225 is configured to crop the 3D lesion volume by $2d \times 2d \times 2d$ in x, y, z dimensions with the RECIST annotation at the center of the cropped 3D volume. In some embodiments, the image preprocessing module 225 further resamples the cropped 3D volume to isotropic resolution of 0.75 mm×0.75 mm×0.75 mm. In some embodiments, the image preprocessing module 225 also shifts the Hounsfield unit (HU) values of the resampled volume to above zero by adding 1024 thereto and normalizes the shifted HU values to 0-1 by dividing 3000 thereby. In some embodiments, the image preprocessing module 225 further zero-pads/crops the boundary of the 3D image, causing the 3D image to have a size of 128×128×64.

In some embodiments, during the second stage, 2D image dataset with RECIST annotations (which may be stored in image store 210) is preprocessed. Each 2D image is a labeled slice having a longest diameter d. The image preprocessing module 225 is configured to crop the 2D image by 2d×2d with RECIST annotation at the center Similar to the 3D image preprocessing described above, in some embodiments, the image preprocessing module 225 further resamples the cropped 2D image to isotropic resolution of 0.75 mm×0.75 mm. In some embodiments, the image preprocessing module 225 also zero-shift and normalize the resampled and cropped 2D image. In some embodiments, the image preprocessing module 225 further zero-pads/crops the boundary of the 2D image, causing the 2D image to have a size of 128×128.

In some embodiments, during the third stage, labeled 3D images (which may be stored in image store 215) are preprocessed. Each labeled 3D image includes a lesion having a largest diameter d. Similar to the preprocessing of the unlabeled 3D images and/or labeled 2D images, the image preprocessing module 225 is configured to crop each labeled 3D image by 2d×2d×2d. In some embodiments, the image preprocessing module 225 also resamples the cropped 3D image to isotropic resolution of 0.75 mm×0.75 mm×0.75 mm. In some embodiments, the image preprocessing module 225 also zero-shift and normalize the resampled and cropped 3D image, and/or zero pads the boundary of the 3D image, causing the 3D image to have a size of 128×128×64.

In some embodiments, the preprocessed images are then split into multiple subsets for training, validation, and/or testing. In some embodiments, for better computational efficiency, the unlabeled and/or labeled 3D images of the first stage and third stage may be resized to 64×64×32, and labeled 2D images of the second stage may be resized to 64×64.

In some embodiments, at least a subset of the preprocessed images is then sent to the modeling engine 230 as input for training one or more image segmentation models 235 (also referred to as "image segmentation network"). In some embodiments, the output of modeling engine 230 and/or the image segmentation network is further processed, such as resampled to a corresponding original size using trilinear interpolation. In some embodiments, Softmax and/or argmax functions are then applied to generate a final binary 3D segmentation. In some embodiments, limited 3D labeled images and abundant 2D labeled RECIST slices are used for the training. Additional details about the modeling engine 230 and/or the image segmentation models 235 are further discussed below with respect to FIGS. 3A-3C, 4A-4C, and 5-6.

Example Embodiments of Machine-Learning Networks

In some embodiments, the modeling engine 230 is configured to train a Swin transformer-based machine learning model. Since both 2D and 3D images are used for the training, the Swim transformer-based machine learning model is also referred to as a multi-dimension unified Swin transformer (MDU-ST). A Swin transformer encoder in a machine-learning network transforms the input, regardless of its dimensions, to be unified as a 2D linear embedded feature map one dimension matching the number of tokens in the input. The learned feature map after transformer encoding can be decoded to the input shape. This property enables a novel lesion segmentation framework by leveraging (1) unlabeled 3D image datasets, and (2) both rich 2D and limited 3D labeled datasets, alleviating the overfitting issue for a transformer-based model.

Figure 3A:
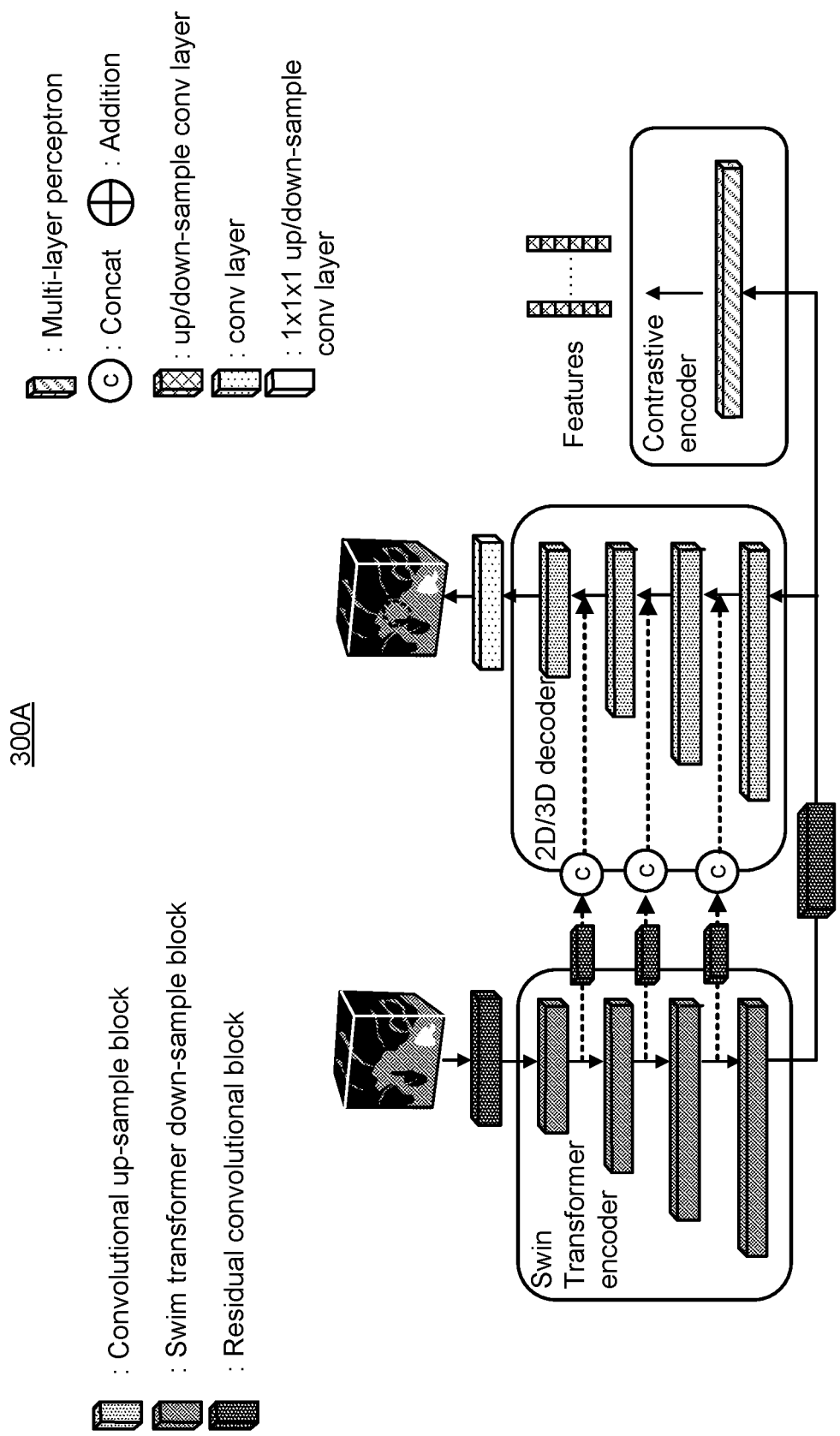
FIG. 3A is a block diagram illustrating an overall architecture of a transformer network, according to one embodiment.

FIG. 3A illustrates a block diagram of an overall architecture of the modeling engine 230 for training an MDU-ST network 300A. In some embodiments, MDU-ST network 300A deploys a 3D U-shaped encoder-decoder architecture. In the three stages of the pipeline, the MDU-ST has the same encoder to store the information from different stages while utilizing different decoders for different tasks. In some embodiments, the encoder is a contraction network including one patch embedding layer followed by multiple (e.g., four) Swin transformer down-sample blocks to capture the multi-scale semantic context in the input lesion.

The patch embedding layer may be a down-sampling residual convolutional block. FIG. 3C illustrates an example architecture of a down-sampling residual convolutional block 300B. The down-sampling residual convolutional block 300B includes two parallel paths. In some embodiments, in the first path, the input is passed into a 3D convolutional layer, which may contain 32 spatial filters with a kernel size of 3×3×1 and a stride size of 2×2×1, and then a 3D convolutional layer with an isotropic kernel size of 1×1×1 and stride size of 2×2×1.

Each Swin transformer down-sample block includes a down-sample convolutional layer, a window self-attention (W-SA) module, and a shifted-window self-attention (SW-SA) module. The down-sampling convolutional layer down-samples input features $$X \in \mathbb{R}^{H \times W \times L \times C} \text{ to } X_e \in \mathbb{R}^{\frac{H}{2} \times \frac{W}{2} \times L \times 2C}.$$

In the W-SA module, the embedded features are partitioned into non-overlapping windows by the window partition layer. In some embodiments, $X_e$ is divided into $$\frac{H}{2} \times \frac{W}{2} \times L \times 2C$$

windows with the size of $N \times N \times N_L$, where N may be empirically set to 4, 4, 8, 4 for the first to the fourth Swin transformer blocks, $N_L$ may be set to N for 3D data and set to 1 for 2D data. Partitioned input is a 3D feature map, denoted as $$W \in \mathbb{R}^{\left(\frac{H}{2} \times \frac{W}{2} \times L \times 2C\right) \times (N \times N \times N_L)}.$$

In some embodiments, for each window, a MHSA module includes I parallel self-attention heads, each of which learns global features across the window. Each head includes independent weight matrices Query (Q), Key (K), and Value (V), which performs the operations represented by the following equations:

$$head_i = \text{softmax}\left(\frac{W_l Q_i (W_l K_i)^T}{\sqrt{d_k}}\right)(W_l V_i)$$

$$A_l = Concat(head_i, \cdots, head_l)W_{out}$$

where $A_l \in \mathbb{R}^{(N \times N \times N_L)}$ is the attentions calculated for the lth window and $W_{out}$ is another weight matrix. By gathering all the As, an attention map $X_{out}$ is obtained with the same size of the input W. In some embodiments, an additional linear layer may be connected to the MHSA module for better embedding performance. The final output $X_e^{out}$ can then be reshaped back to the original size of the non-partitioned features as $$X_e^{oput} \in \mathbb{R}^{\frac{H}{2} \times \frac{W}{2} \times L \times 2C}.$$

The $X_e^{out}$ is then passed into the SW-SA module, which shifts the partitioned windows by $$\left(\frac{N}{2}, \frac{N}{2}, \frac{N_L}{2}\right)$$

voxels for 3D data, and $$\left(\frac{N}{2}, \frac{N}{2}, 1\right)$$

voxels for 2D data. As such, the following attention calculation can be used to obtain the attentions across the non-shifted windows in the previous W-SA module. Formally, the Swin transformer layer performs:

$$X_e^{out} = \text{linear}(WSA(X_e))$$

$$Y_{out} = \text{linear}(SWSA(X_e^{out}))$$

where $Y_{out}$ is the output of the transformer layer.

Figure 3B:
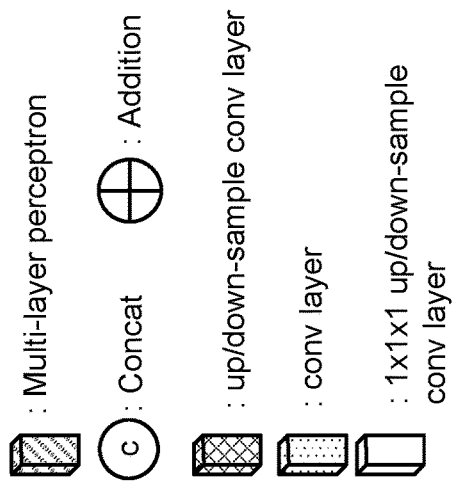
FIG. 3B is a block diagram illustrating a residual 2D or 3D convolutional block, according to one embodiment.
Figure 3C:
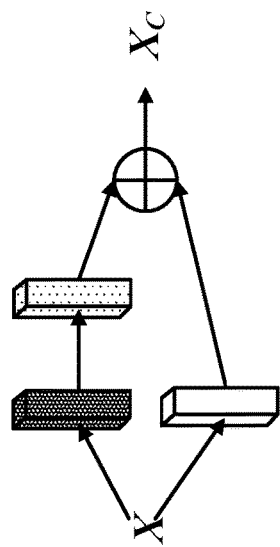
FIG. 3C is a block diagram illustrating a Swin transformer layer, according to one embodiment.
Figure 3C:
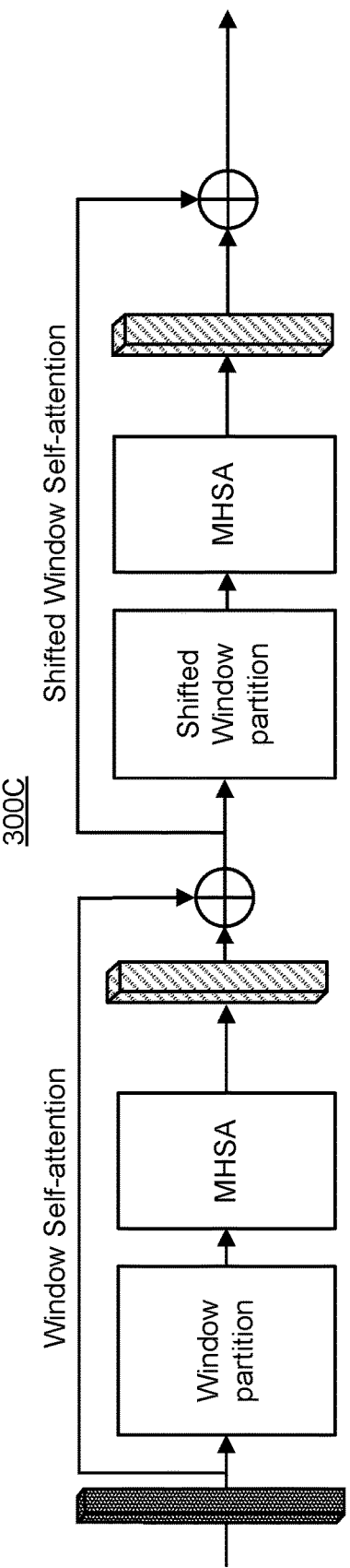

FIG. 3B is a block diagram illustrating a Swin transformer layer 300C (which may correspond to each of the four down-sampling Swim transformer layers shown in FIG. 3A). As illustrated in FIG. 3B, the Swin transformer layer includes a window self-attention (W-SA) module, and a shifted-window self-attention (SW-SA) module. W-SA includes a window-partitioning layer to divide the input features into non-overlapping windows. Then a multi-head self-attention (MHSA) layer is applied to calculate the global information for each window. A linear layer is then applied to embed all the windows into a feature map. the SW-SA has an identical structure to the W-SA module, and a predetermined distance shifts the non-overlapping windows.

Referring back to FIG. 3A, the network 300A also includes a 2D/3D decoder and a contrastive encoder, which may be implemented in different stages. For example, in some embodiments, during the first stage, a 3D decoder and a contrastive encoder are implemented; during the second stage, a 2D decoder is implemented; and during the third stage, a 3D decoder is implemented. The 2D or 3D decoder is a symmetric expanding path with four up-sampling residual convolutional blocks and a final convolutional layer.

The up-sampling residual convolutional blocks on the decoder side may have a similar architecture as the down-sampling residual convolutional block on the encoder side except they use up-sampling convolution as shown in FIG. 3C. The final convolutional layer has an isotropic kernel size of 1 and stride size of 1.

In some embodiments, during the first stage, both a reconstruction decoder and a contrastive encoder are linked in parallel to the main encoder. The reconstruction decoder utilizes a symmetric expansion network, including four 3D-up-sampling residual convolutional blocks, as shown in FIG. 3B. The network may also include a terminal convolutional layer with an isotropic kernel size and stride of 1. The resultant outputs from these parallel paths are combined to form a final output feature map. On the other hand, the contrastive encoder may include two consecutive linear layers, succeeded by an instance normalization and a Leaky-Relu function. In some embodiments, this structure results in an output size of 128, converting the encoder's features into a latent representation.

In some embodiments, during the second stage, an encoder is paired with a 2D segmentation decoder. This decoder includes four 2D up-sampling residual convolutional blocks configured to produce a 2D segmentation probability map.

In some embodiments, during the third stage, a 3D segmentation decoder is implemented, mirroring the structure from the second stage. However, the 2D blocks used in the second stage are swapped for 3D blocks configured to produce a 3D segmentation probability map.

In some embodiments, throughout this machine learning network, every convolutional year (except the final one) is followed by an instance normalization and then a leaky-Relu activation. In some embodiments, post every MHSA linear layer, layer normalization is implemented, except after the terminal linear layer within the contrastive encoder. In some embodiments, for the training of these networks, the Adam optimizer may be used, set at a learning rate of 0.0001.

Figure 4A:
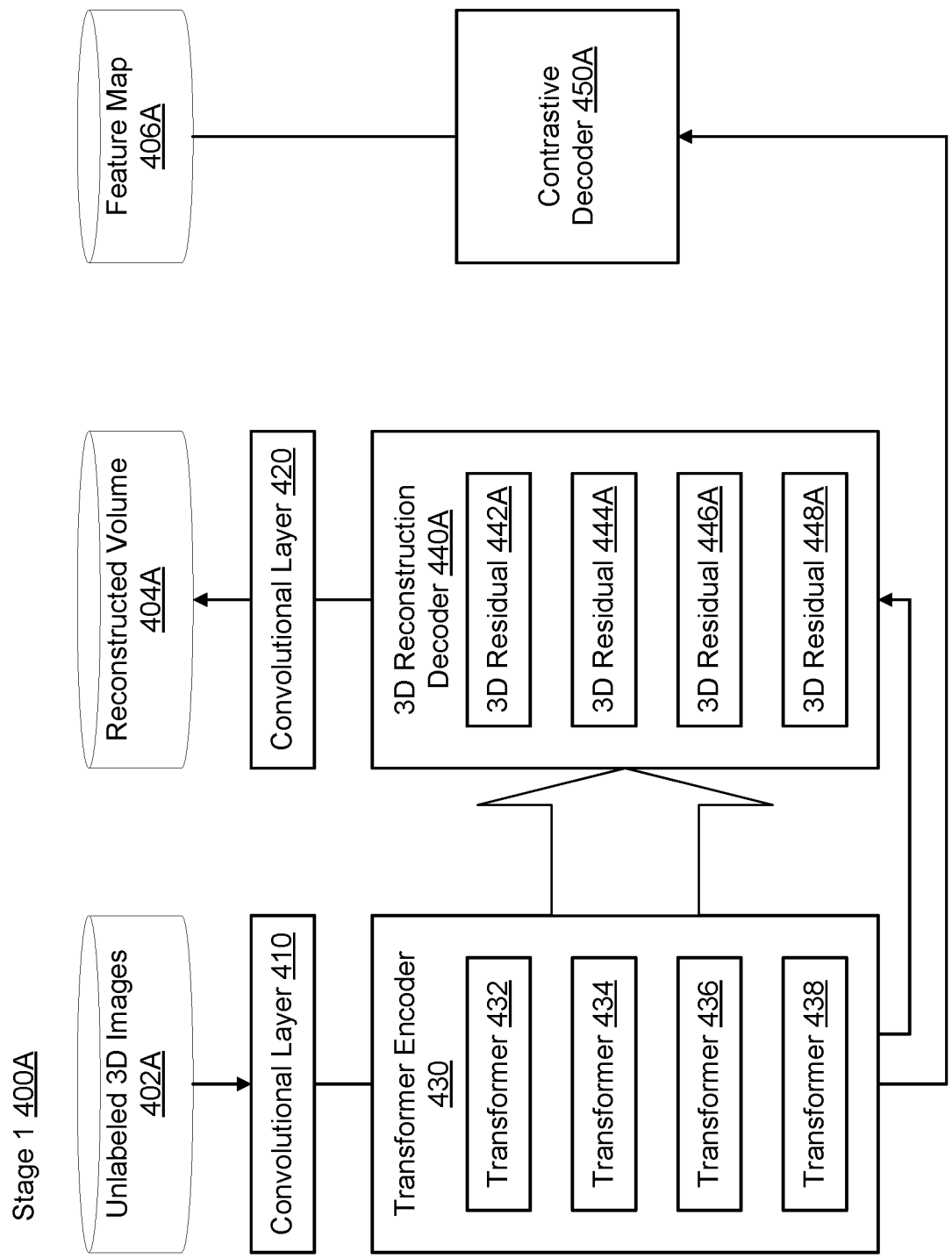
FIG. 4A is a block diagram illustrating a first machine-learning network configured to pre-train a transformer encoder during a first stage, according to one embodiment.

Additional details about the three-stage training are further described below with respect to FIGS. 4A-4C. FIG. 4A illustrates a network 400A that may be implemented in the first stage (also referred to as stage 1) of training. As illustrated in FIG. 4A, a 3D reconstruction decoder 440A and a contrastive decoder 450A are connected in parallel to the transformer encoder 430. The transformer encoder 430 includes 4 Swim transformer down-sample blocks 432, 434, 436, and 438 configured to receive 3D unlabeled image dataset 402A. As discussed above, the 3D unlabeled image dataset includes 3D images with a RECIST annotation at the center. The 3D reconstruction decoder 440A is a symmetric expanding path with four 3D up-sampling residual convolutional blocks 442A, 444A, 446A, and 448A. In some embodiments, the contrastive decoder 450A includes two sequential linear layers to map the encoder's features to a latent representation.

In some embodiments, the network 400A also includes residual convolutional blocks at the skip connections between encoder and decoder.

The 3D reconstruction decoder 440A is configured to receive output of transformer encoder 430 to generate a reconstructed volume 404A. The contrastive decoder 450A, in parallel with the 3D reconstruction decoder 440A, is also configured to receive output of transformer encoder 430 to generate a feature map 406A.

In particular, in stage 1, the transformer encoder 430 (also referred to as MDU-ST's encoder) is pre-trained with two proxy tasks, namely, contrastive learning and volume reconstruction, to learn the general 3D information to support the final 3D lesion segmentation. In some embodiments, in the volume reconstruction task, a Region-of-Interest (ROI) in the lesion volume X with a volume ratio of 15% may be randomly masked out. The Swim transformer encoder and the reconstruction decoder are trained to recover the masked lesion volume to the original volume X by the mean absolute error loss (MAE) function.

In some embodiments, given a lesion volume and its corresponding augmented volume by masking-out 15% of the volume (positive pair), the contrastive learning trains the network to output representations that maximize the mutual information for the two volumes. Conversely, for a pair of two different lesions (negative pair), the network is trained to output representations with minimized mutual information by the normalized-temperature-scaled cross entropy loss (NT-Xent).

$$l_{i,j} = -\log \frac{\exp\left(sim(z_i, z_j)/\tau\right)}{\sum_{k=1}^{2N} 1_{[k \neq i]} \exp\left(sim(z_i, z_k)/\tau\right)}$$

where $1_{[k \neq i]} \in \{0,1\}$ is an indicator function evaluating to 1 if $k \neq i$, z is the feature map 406A, and $\tau$ is a temperature parameter.

Accordingly, the final objective function is a sum of the MAE loss and NT-Xent loss. After the pre-training of the volume reconstruction and contrastive learning is finished, the decoder 440A is removed. The encoder 430 with the 3D general hierarchical representation is used for the downstream 2D segmentation in the second stage.

Figure 4B:
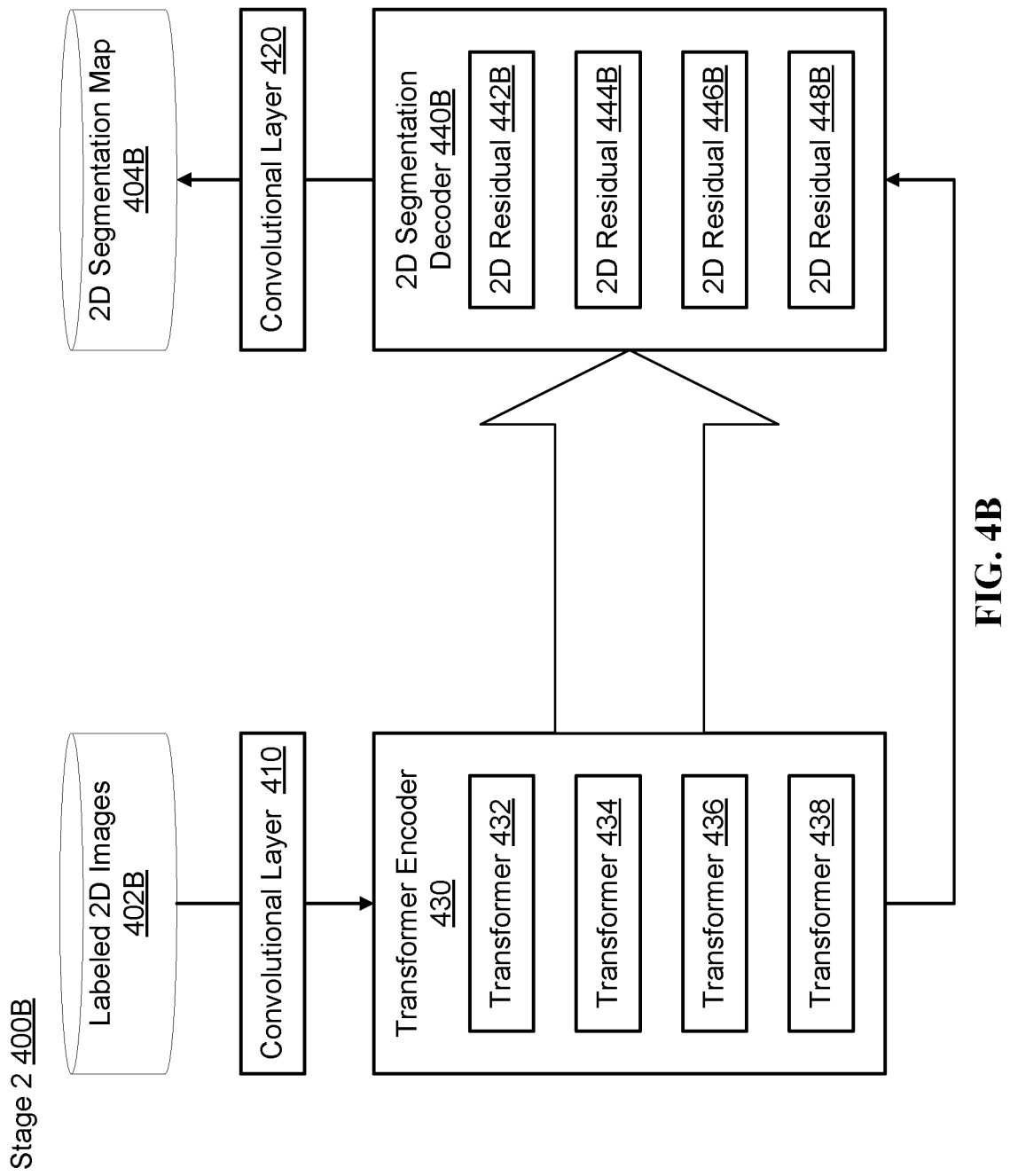
FIG. 4B is a block diagram illustrating a second machine-learning network configured to fine-tune the pre-trained transformer encoder of FIG. 4A during a second stage, according to one embodiment.

FIG. 4B illustrates a network 400B that may be implemented in the second stage (also referred to as stage 2 of training. As illustrated in FIG. 4B, in stage 2, the contrastive decoder 450A and reconstruction decoder 440A of FIG. 4A are removed, and a 2D segmentation decoder 440B is connected to the encoder. The transformer encoder 430 in FIG. 4B is pre-trained by the network 400A. Here, the transformer encoder 430 receives labeled 2D images 402B as input. The 2D segmentation decoder 440B includes four 2D up-sampling residual convolutional blocks 442B, 444B, 446B, and 448B to reconstruct a 2D segmentation map 404B from the features output from the transformer encoder 430.

In particular, in stage 2, an axial dimension is expanded to the 2D lesion slices so the input can be regarded as a 3D volume and the axial length is 1. Accordingly, the output features from each Swim transformer layer have size of $$\frac{H}{2} \times \frac{W}{2} \times 1 \times 2C,$$

which is then reshaped to $$\frac{H}{2} \times \frac{W}{2} \times 2C.$$

In some embodiments, to better convey the high-resolution information to the decoder, the features of each Swim transformer layer are connected to the corresponding residual convolutional block via skip connections.

In some embodiments, the network 400B is optimized by Dice and cross entropy (Dice-CE) loss. After the 2D segmentation is finished, the 2D decoder is removed. Then the encoder 430, with the 3D general representation and 2D segmentation representations, is used for learning the 3D lesion segmentation representations in the third stage.

Figure 4C:
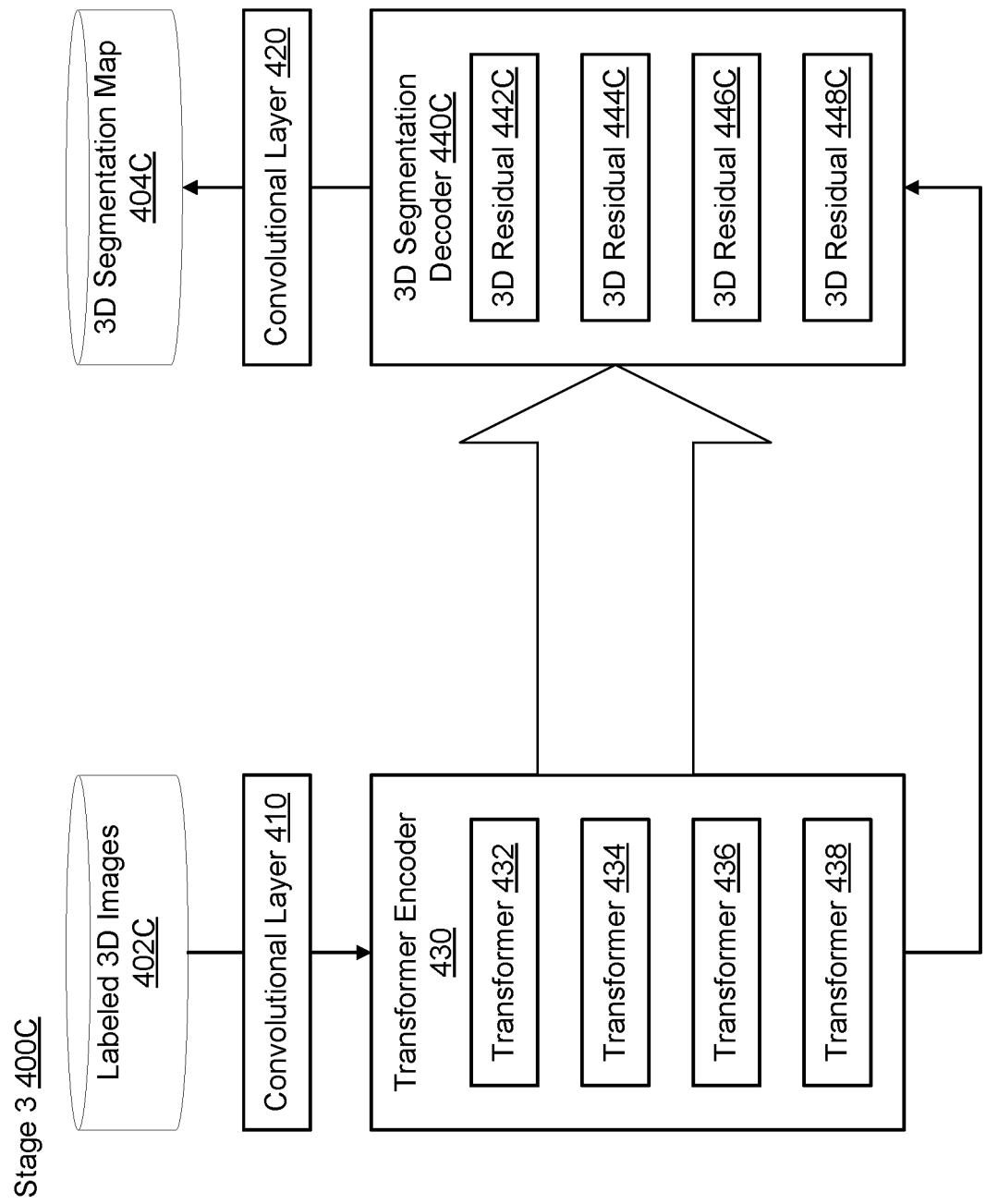
FIG. 4C is a block diagram illustrating a third machine-learning network configured to further fine-tune the pre-trained transformer encoder of FIG. 4A, or the 2D fine-tuned transformer encoder of FIG. 4B during a third stage, according to one embodiment.

FIG. 4C illustrates a network 400C that may be implemented in the third stage (also referred to as stage 3 of training. In stage 3, the transformer encoder 430 receives labeled 3D images 402C as input, and a 3D segmentation decoder 440C, which may be identical or similar to the reconstruction decoder 440A in network 400A of stage 1, replaces the 2D decoder to output a 3D segmentation map 404C for the 3D lesion scans. As illustrated in FIG. 4C, similar to the reconstruction decoder 440A, the 3D segmentation decoder 440C also includes four 3D up-sampling residual convolutional blocks 442C, 444C, 446C, and 448C. In some embodiments, the output features from each encoder's layer are concatenated to the corresponding 3D residual convolutional block via skip connection. In some embodiments, the 3D segmentation network 400C is trained by Dice-CE loss.

Note, the above-described 3-stage training may be fully or partially implemented, and the strategy of training could be flexible. For example, in some embodiments, only stages 1-2 of training are implemented. In some embodiments, only stages 1 and 3 of training are implemented. In some embodiments, only stages 2 and 3 of training are implemented. The strategy of training can be training stage 1, 2, and 3 one by one, training two or three stages simultaneously by using multiple decoders at the same time, training two or three stages in an alternating way by swapping the decoders for different input. In some embodiments, the fully or partially implemented training may also be combined with additional training techniques or additional stages of training.

Figure 5:
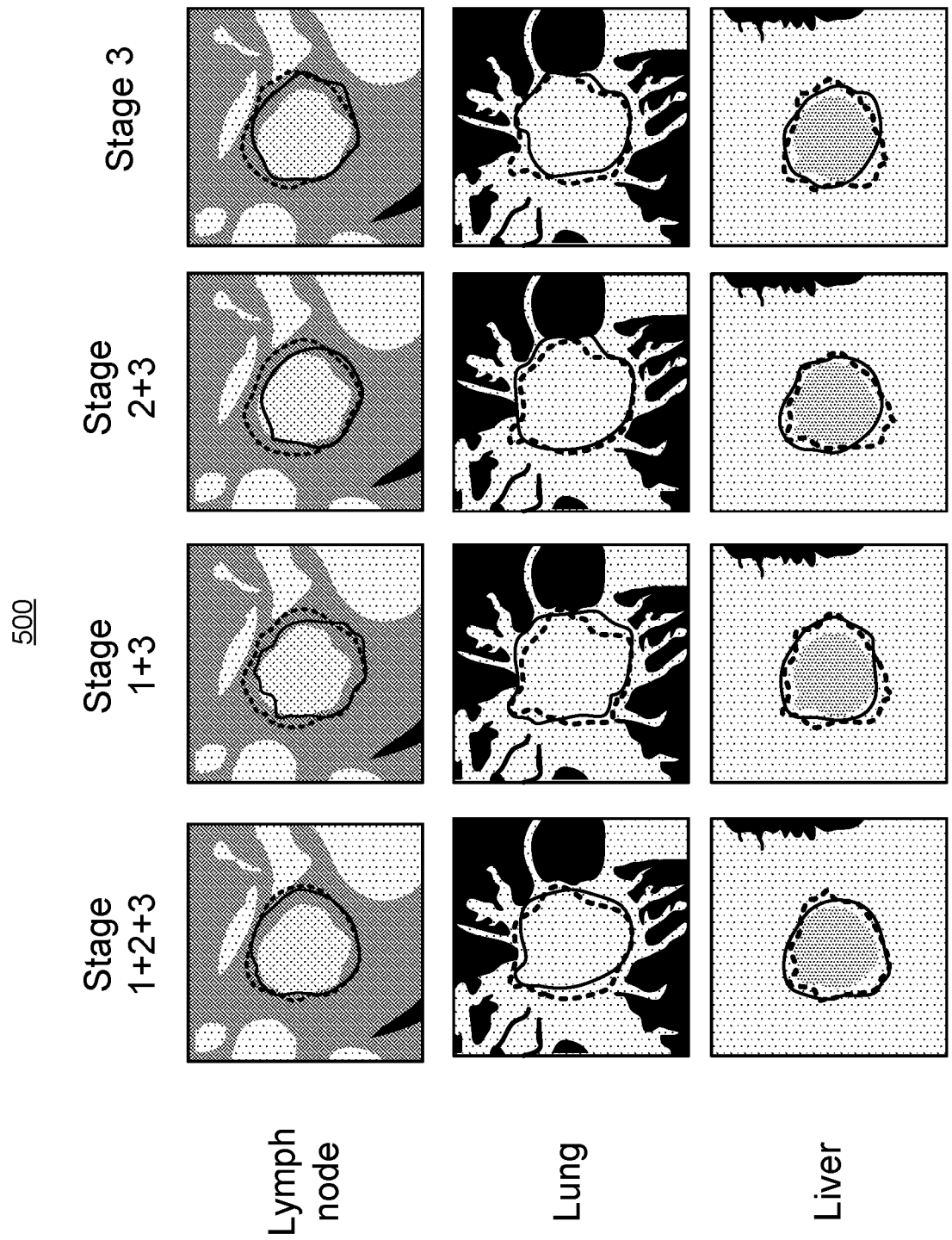
FIG. 5 illustrates example results in segmentations of lymph node, lung, and liver tumors using machine-learning models trained based on the principles described herein, according to one embodiment.

FIG. 5 is a graph showing results of the different combinations of stages of training in segmentations of lymph node, lung, and liver tumors, in accordance with some embodiments. The first column shows the results of full 3 stages of training, the second column shows the results of only stages 1 and 3 of training, and the third column shows the results of only stages 2 and 3 of training. The dotted lines represent ground truth, and the solid lines represent predictions. As shown, the predictions of full 3 stages of training are the closest to the ground truth, although the predictions of only 2 stages of training are also reasonably close to the ground truth.

Example Method for Training an Image Segmentation Model

Figure 6:
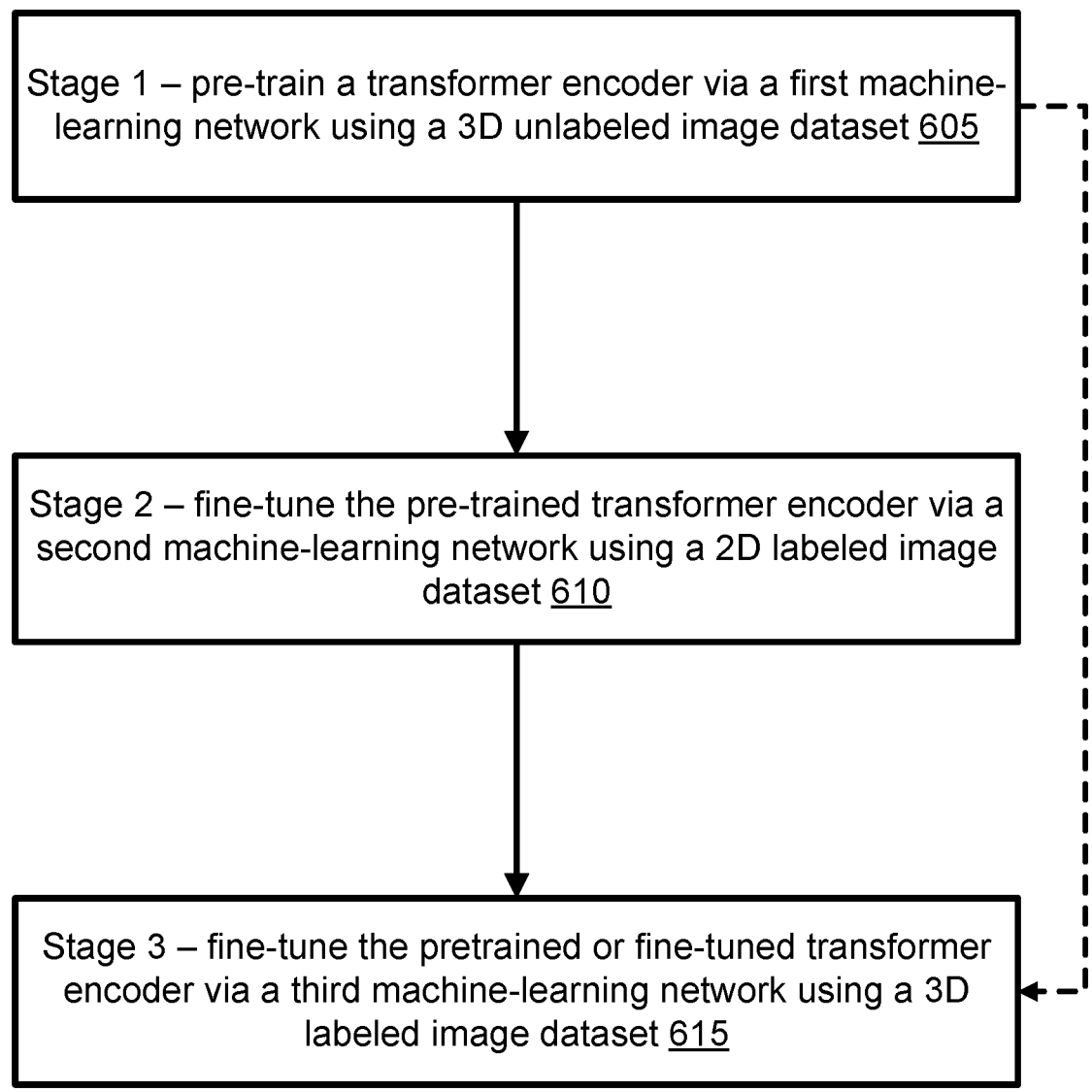
FIG. 6 is a diagram illustrating a method of training a transformer-based machine learning model for image segmentation, according to one embodiment.

FIG. 6 is a diagram illustrating a method 600 of training an image segmentation model 235, according to one embodiment. The method may be performed by the image segmentation system 125 or any computing system having access to training datasets, such as unlabeled 3D image store 205, labeled 2D image store 210, and/or labeled 3D image store 215.

During a first stage of training, the image segmentation system 125 pre-trains 605 a transformer encoder via a first machine learning network (e.g., machine learning network 400A of FIG. 4A) using an unlabeled 3D image dataset. The unlabeled 3D image dataset contains a plurality of 3D medical images, each of which includes multiple slices above and below the tumors identified by RECIST annotations in 2D. The first machine learning network includes the transformer encoder, a first CNN and/or transformer decoder (e.g., 3D reconstruction decoder 440A of FIG. 4A), and a contrastive decoder (e.g., contrastive decoder 450A of FIG. 4A). The first CNN/transformer decoder and the contrastive decoder are connected to the transformer encoder in parallel. The transformer encoder receives a 3D image in the unlabeled 3D image dataset as input to generate an output. The first CNN/transformer decoder receives the output of the transformer encoder to generate a reconstructed volume, and the contrastive encoder also receives the output of the transformer encoder to generate a feature map.

In some embodiments, during the first stage of training, an encoder of an MDU-ST is pretrained using multiple self-supervised tasks, including contrastive learning and volume reconstruction. The objective of the pretraining is to capture the general 3D information. For the volume reconstruction task, a Region-of-Interest (ROI) from the lesion volume X is randomly obscured, accounting for a volume ratio of 15%. Both a Swin transformer encoder and a reconstruction decoder work together to restore this masked portion of the lesion volume back to its initial state, employing the mean absolute error (MAE) loss function.

In some embodiments, when provided with a lesion volume paired with its deliberately obscured version (labeled a positive pair), the method of contrastive learning causes the network to produce representation that maximizes (or at least increases) the mutual information between these volumes. On the other hand, when provided with two distinct lesions (labeled as negative pair), the network is trained to generate representations where mutual information is minimized (or at least reduced) via NT-Xent. As such, the final objective function is a sum of the MAE loss and NT-Xent loss. After the pre-training is completed, the decoders are removed. The encoder carrying general 3D representation is the used for training in a next stage.

During a second stage of training, the image segmentation system 125 fine-tunes 610 the pre-trained transformer encoder via a second machine learning network (e.g., machine learning network 400B of FIG. 4B) using a labeled 2D image dataset. The labeled 2D image dataset contains a plurality of 2D medical images, each of which having a corresponding RECIST annotation. The second machine learning network includes the pre-trained transformer encoder resulting from the first stage of training and a second CNN/transformer decoder (e.g., 2D segmentation decoder 440B of FIG. 4B). The pre-trained transformer encoder receives a 2D image in the labeled 2D image dataset as input to generate an output. The second CNN/transformer decoder receives the output of the transformer encoder to generate a 2D segmentation map.

In some embodiments, during the second stage, a 2D decoder is linked to the already trained encoder to learn 2D segmentation data. The axial dimension for the 2D lesion slices is adjusted, allowing to be processed as a 3D volume, albeit with an axial span of just 1. This results in each Swin transformer layer outputting features of dimensions H×W× 1×2 C.

In some embodiments, to effectively transmit high-resolution data to the decoder, features from every Swin transformer layer undergo processing through 2D residual convolutional blocks. These are then bridged using skip connections to their respective residual convolutional blocks on the decoder's end. In some embodiments, the entire network is fine-tuned using both Dice and across-entropy (Dice-CE) loss methods. Upon completing 2D segmentation training, the encoder, enriched with general 3D data as well as specific 2D data, is ready for a next stage training.

During a third stage of training, the image segmentation system 125 fine-tunes 615 the pre-trained transformer encoder (resulted from the first stage of training) or the 2D fine-tuned transformer encoder (resulted from the second stage of training) via a third machine-learning network using a labeled 3D image dataset. The labeled 3D image dataset contains a plurality of 3D medical images, each of which has annotations at boundaries of lesions. The third machine-learning network includes (1) the pre-trained transformer encoder resulting from the first stage of training or the fine-tuned transformer encoder resulting from the second stage of training, and (2) a third CNN/transformer decoder. The pre-trained or previously fine-tuned transformer encoder receives a 3D image in the labeled 3D image dataset as input to generate an output. The third CNN/transformer decoder receives the output of the transformer encoder to generate a 3D segmentation map.

In some embodiments, during the third stage, a 3D decoder is linked to the encoder. Features outputted from each layer of the encoder are channeled into 3D residual convolutional blocks, and then concatenated to their respective 3D residual convolutional blocks using skip connections. In some embodiments, the comprehensive 3D segmentation network also undergoes training using the Dice-CE loss method.

Figure 7:
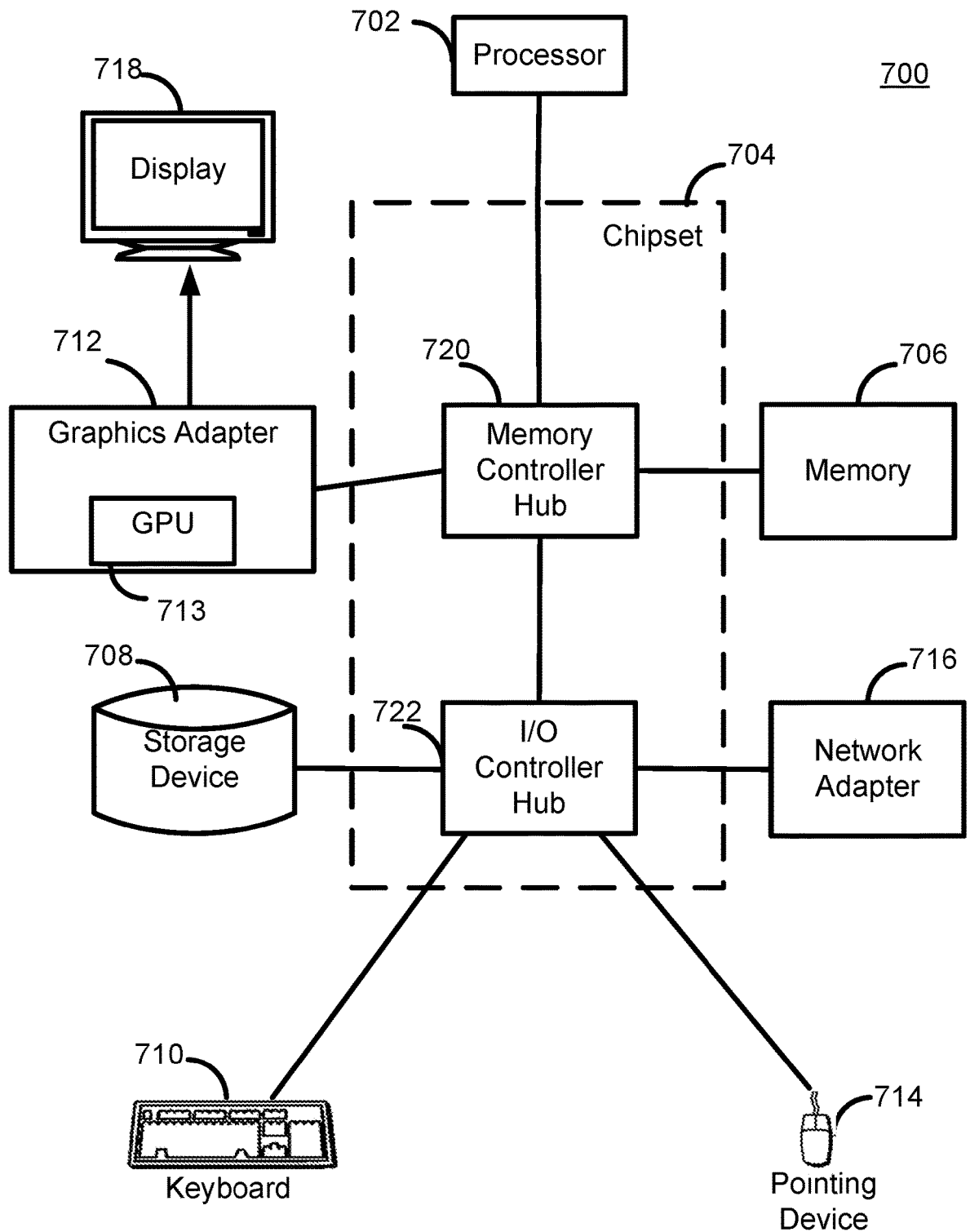
FIG. 7 is a high-level block diagram illustrating the computer logic components of an image segmentation system, according to one embodiment.

FIG. 7 is a high-level block diagram illustrating an example computer 700 suitable for implementing the entity of FIG. 1. The example computer 700 may be accessible by users via a computer network. For example, the example computer 700 may be a remote computing system hosted on a cloud platform and/or a virtual machine provided by a cloud service. The example computer 700 includes at least one processor 702 coupled to a chipset 704. The chipset 704 includes a memory controller hub 720 and an input/output (I/O) controller hub 722. A memory 706 and a graphics adapter 712, which contains a graphics processing unit (GPU) 713, are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer 700. The graphics adapter 712 displays images and other information on the display 718. The network adapter 716 couples the computer 700 to one or more computer networks.

The GPU 713 in the graphics adapter 712 may be used for other high-performance computation as well as processing graphical data for presentation on the display 718. In one embodiment, the GPU 713 is used to process data from the image segmentation system 125, where it is used to accelerate model training, image processing, and image segmentation.

The types of computers used by the entities of FIGS. 1 and 2 can vary depending upon the embodiment and the processing power required by the entity. For example, the image segmentation system 125 might include a desktop computer to provide the functionality described. Furthermore, the computers can lack some of the components described above, such as keyboards 710, graphics adapters 712, and displays 718.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method of multi-stage training of a transformer-based machine-learning model, the method comprising at least two of the following three stages:

during a first stage of training, pre-training a transformer encoder via a first machine-learning network using an unlabeled 3D image dataset, the unlabeled 3D image dataset containing a plurality of 3D medical images, each of which includes multiple slices above and below tumors identified by a annotation in 2D, and the first machine-learning network including the transformer encoder, a first CNN/transformer decoder, and a contrastive encoder;

during a second stage of training, fine-tuning the pre-trained transformer encoder via a second machine-learning network using a labeled 2D image dataset, the labeled 2D image dataset containing a plurality of 2D medical images, each of which having an annotation, and the second machine-learning network including the pre-trained transformer encoder resulted from the first stage of training and a second CNN/transformer decoder; and during a third stage of training, fine-tuning the pre-trained or previously fine-tuned transformer encoder via a third machine-learning network using a labeled 3D image dataset, the labeled 3D image dataset containing a plurality of 3D medical images, each of which having annotations at boundaries of lesions, and the third machine-learning network including (1) the pre-trained transformer encoder resulted from the first stage of training or the fine-tuned transformer encoder resulted from the second stage of training, and (2) a third CNN/transformer decoder.

2. The computer-implemented method of claim 1, wherein during the first stage, the transformer encoder is connected to the first CNN/transformer decoder and the contrastive encoder in parallel, the transformer encoder receives a 3D image in the unlabeled 3D image dataset as input to generate an output, the first CNN/transformer decoder receives the output of the transformer encoder to generate a reconstructed volume, and the contrastive encoder receives the output of the transformer encoder to generate a feature map.

3. The computer-implemented method of claim 1, wherein during the second stage, the pre-trained transformer encoder receives a 2D image in the labeled 2D image dataset as input to generate an output, and the second CNN/transformer decoder receives the output of the transformer encoder to generate a 2D segmentation map.

4. The computer-implemented method of claim 1, wherein during the third stage, the pre-trained or previously fine-tuned transformer encoder receives a 3D image in the labeled 3D image dataset as input to generate an output, and the third CNN/transformer decoder receives the output of the transformer encoder to generate a 3D segmentation map.

5. The computer-implemented method of claim 1, the method comprising all three of the three stages.

6. The computer-implemented method of claim 1, wherein two or three stages of training are performed simultaneously by using multiple decoders.

7. The computer-implemented method of claim 1, wherein two or three stages of training are performed alternately by swapping decoders for different input.

8. The computer-implemented method of claim 1, wherein the transformer encoder includes a plurality of transformer layers, the CNN/transformer decoders are CNN decoders, the first and third CNN decoder includes a plurality of residual 3D convolutional block, the second CNN decoder includes a plurality of residual 2D convolutional block, each convolutional layer corresponds to a residual 3D convolutional block or a residual 2D convolutional block.

9. The computer-implemented method of claim 8, wherein each transformer layer includes a down-sampling module, a window self-attention (W-SA) module, and a shifted window self-attention (SW-SA) module.

10. The computer-implemented method of claim 9, wherein each of the SW-SA module or the SW-SA module includes:
- a window-partitioning layer configured to divide input features into non-overlapping windows;
- a multi-head self-attention (MHSA) layer configured to calculate global information for each window; and
- a linear layer configured to embed all the windows into a feature map.

11. A computer program product, comprising a non-transitory computer readable medium having instructions encoded thereon that, when executed by a processor, cause the processor to:
- train a transformer-based machine-learning model, the training comprising at least two of the following three stages:
  - during a first stage of training, pre-training a transformer encoder via a first machine-learning network using an unlabeled 3D image dataset, the unlabeled 3D image dataset containing a plurality of 3D medical images, each of which includes multiple slices above and below tumors identified by an annotation in 2D, and the first machine-learning network including the transformer encoder, a first CNN/transformer decoder, and a contrastive encoder;
  - during a second stage of training, fine-tuning the pre-trained transformer encoder via a second machine-learning network using a labeled 2D image dataset, the labeled 2D image dataset containing a plurality of 2D medical images, each of which having an annotation, and the second machine-learning network including the pre-trained transformer encoder resulted from the first stage of training and a second CNN/transformer decoder; and
  - during a third stage of training, fine-tuning the pre-trained or previously fine-tuned transformer encoder via a third machine-learning network using a labeled 3D image dataset, the labeled 3D image dataset containing a plurality of 3D medical images, each of which having annotations at boundaries of lesions, and the third machine-learning network including (1) the pre-trained transformer encoder resulted from the first stage of training or the fine-tuned transformer encoder resulted from the second stage of training, and (2) a third CNN/transformer decoder.

12. The computer program product of claim 11, wherein during the first stage, the transformer encoder is connected to the first CNN/transformer decoder and the contrastive encoder in parallel, the transformer encoder receives a 3D image in the unlabeled 3D image dataset as input to generate an output, the first CNN/transformer decoder receives the output of the transformer encoder to generate a reconstructed volume, and the contrastive encoder receives the output of the transformer encoder to generate a feature map.

13. The computer program product of claim 11, wherein during the second stage, the pre-trained transformer encoder receives a 2D image in the labeled 2D image dataset as input to generate an output, and the second CNN/transformer decoder receives the output of the transformer encoder to generate a 2D segmentation map.

14. The computer program product of claim 11, wherein during the third stage, the pre-trained or previously fine-tuned transformer encoder receives a 3D image in the labeled 3D image dataset as input to generate an output, and the third CNN/transformer decoder receives the output of the transformer encoder to generate a 3D segmentation map.

15. The computer program product of claim 11, wherein the training comprises all three of the three stages.

16. The computer program product of claim 11, wherein two or three stages of training are performed simultaneously by using multiple decoders.

17. The computer program product of claim 11, wherein two or three stages of training are performed alternately by swapping decoders for different input.

18. The computer program product of claim 11, wherein the transformer encoder includes a plurality of transformer layers, the first and third CNN/transformer decoder includes a plurality of residual 3D convolutional block, the second CNN/transformer decoder includes a plurality of residual 2D convolutional block, each transformer layer corresponds to a residual 3D convolutional block or a residual 2D convolutional block.

19. The computer program product of claim 18, wherein each transformer layer includes a down-sampling module, a window self-attention (W-SA) module, and a shifted window self-attention (SW-SA) module, and wherein each of the SW-SA module or the SW-SA module includes:
- a window-partitioning layer configured to divide input features into non-overlapping windows;
- a multi-head self-attention (MHSA) layer configured to calculate global information for each window; and
- a linear layer configured to embed all the windows into a feature map.

20. A computer system, comprising
one or more processors; and
a non-transitory computer readable medium having instructions encoded thereon that, when executed by a processor, cause the computer system to:
- train a transformer-based machine-learning model, the training comprising at least two of the following three stages:
  - during a first stage of training, pre-training a transformer encoder via a first machine-learning network using an unlabeled 3D image dataset, the unlabeled 3D image dataset containing a plurality of 3D medical images, each of which includes multiple slices above and below tumors identified by an annotation in 2D, and the first machine-learning network including the transformer encoder, a first CNN/transformer decoder, and a contrastive encoder;
  - during a second stage of training, fine-tuning the pre-trained transformer encoder via a second machine-learning network using a labeled 2D image dataset, the labeled 2D image dataset containing a plurality of 2D medical images, each of which having An annotation, and the second machine-learning network including the pre-trained transformer encoder resulted from the first stage of training and a second CNN/transformer decoder; and
  - during a third stage of training, fine-tuning the pre-trained or previously fine-tuned transformer encoder via a third machine-learning network using a labeled 3D image dataset, the labeled 3D image dataset containing a plurality of 3D medical images, each of which having annotations at boundaries of lesions, and the third machine-learning network including (1) the pre-trained transformer encoder resulted from the first stage of training or the fine-tuned transformer encoder resulted from the second stage of training, and (2) a third CNN/transformer decoder.

\* \* \* \* \*